(No Model.) 4 Sheets—Sheet 1.
E. WIARD.
SUGAR CANE CULTIVATOR.

No. 327,633. Patented Oct. 6, 1885.

Witnesses:
Edward T. Fenwick
Theo. Lang.

Inventor:
Edward Wiard
by his Attys
Mason Fenwick & Lawrence

SUGAR CANE CULTIVATOR.

No. 327,633. Patented Oct. 6, 1885.

Witnesses:
Edward T. Fenwick
Theo Lang.

Inventor:
Edward Wiard
by his Attys
Mason Fenwick and Lawrence

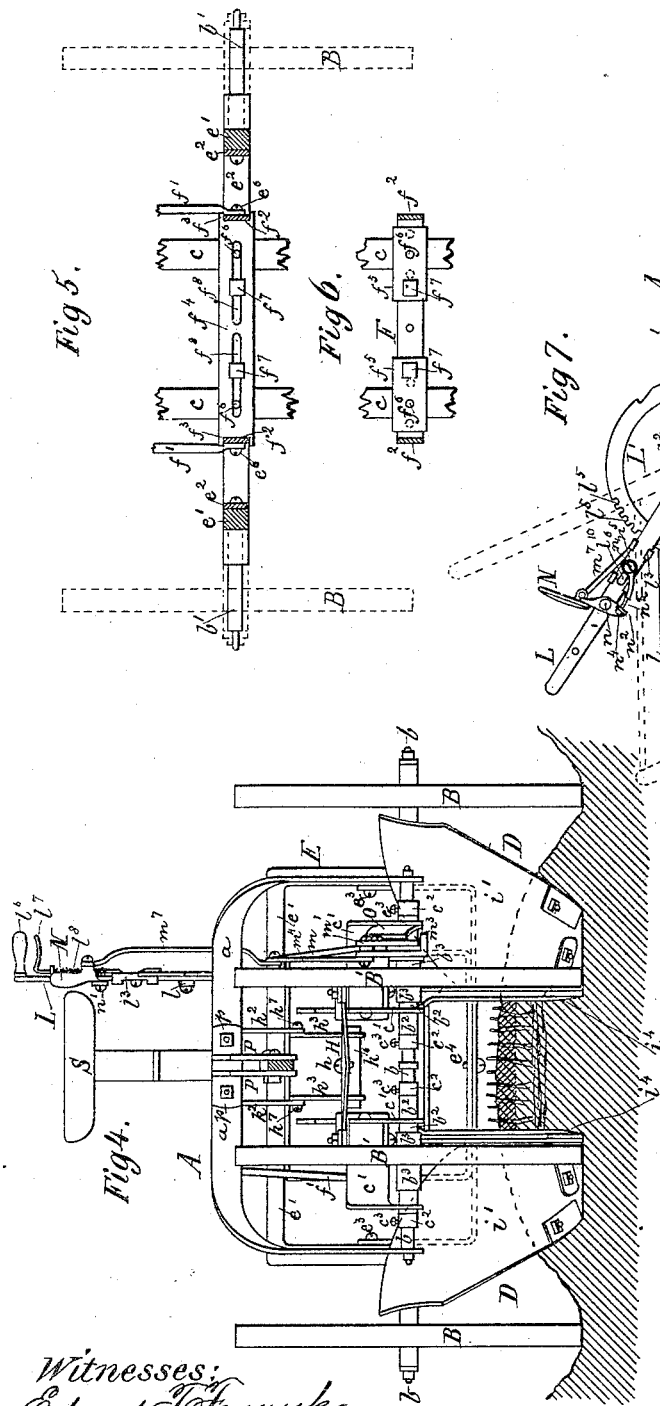

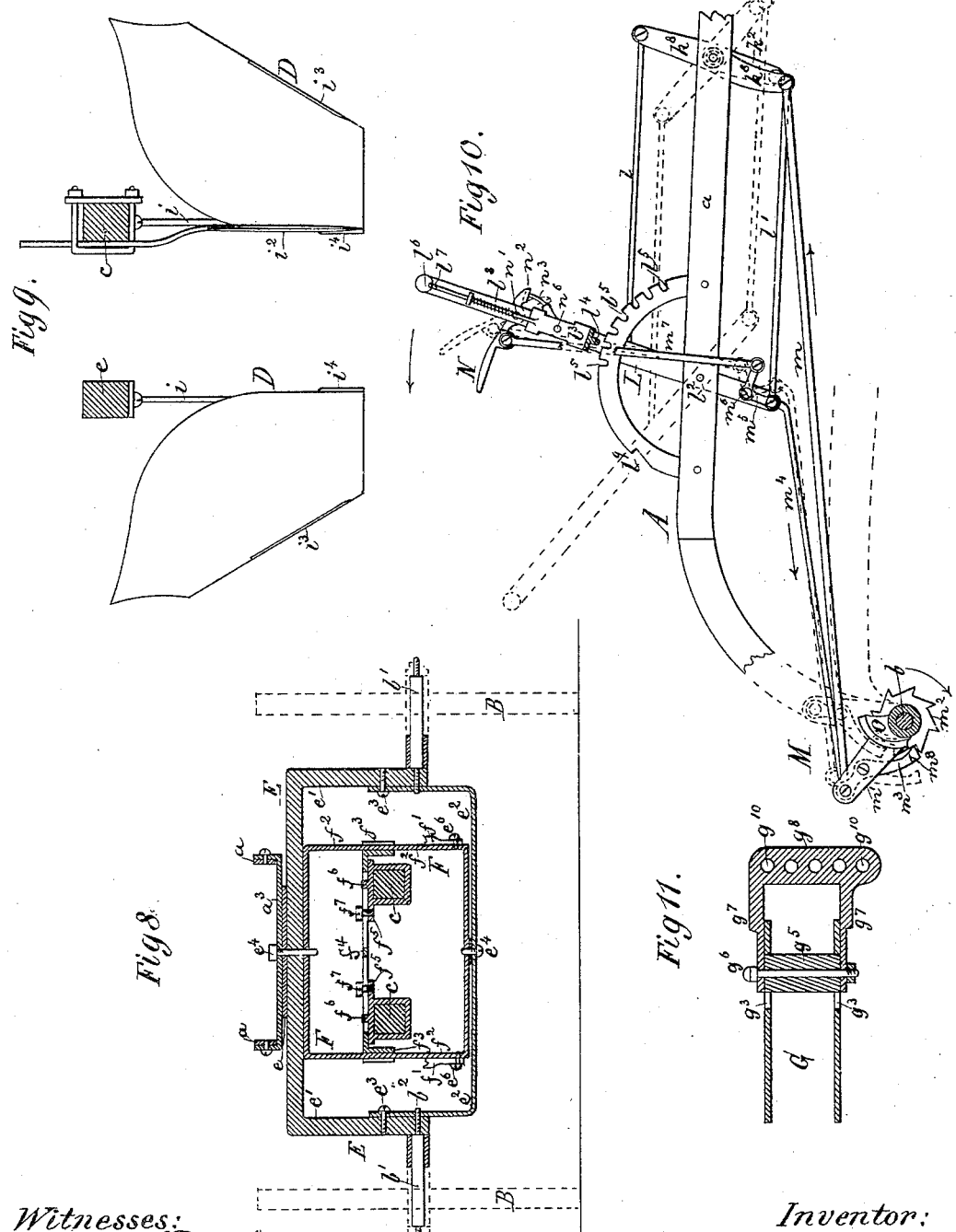

UNITED STATES PATENT OFFICE.

EDWARD WIARD, OF LITCHFIELD, MINNESOTA.

SUGAR-CANE CULTIVATOR.

SPECIFICATION forming part of Letters Patent No. 327,633, dated October 6, 1885.

Application filed July 1, 1885. Serial No. 170,337. (No model.)

*To all whom it may concern:*

Be it known that I, EDWARD WIARD, a citizen of the United States, residing at Litchfield, in the county of Meeker and State of Minnesota, have invented certain new and useful Improvements in Sugar-Cane Cultivators; and I do hereby declare the following to be a full, clear, and exact description of the invention, such as will enable others skilled in the art to which it appertains to make and use the same.

My improved cultivator comprises several novel features of construction and combinations of parts, as will be hereinafter described and specifically claimed, and it is designed for use as follows: After the "mother cane" is laid longitudinally, in the form of fish-poles close together, so as to fill a ditch, say, eight inches deep and from twelve to fifteen inches wide, (this operation being performed once in about every four years,) it becomes necessary in early spring to cultivate it. This has heretofore usually been done with an ordinary large plow cutting three furrows on each side, leaving a ridge from fourteen to twenty inches in height, thereby allowing the heat of the sun to readily penetrate the mother cane and start the sprouts at the sides of the ridges. It has not been deemed desirable to disturb the center or immediate covering soil of the mother cane, if the soil on each side can be removed to a sufficient depth to accomplish the starting of growth of said cane. The next operation has been to shave off from two to four inches of the "sour" cane and deposit it in the bottom of the two furrows on opposite sides of the ridge.

My cultivator is designed to perform at once the whole operation of cultivating—viz., formation of the side furrows about the mother cane and shaving off the sour cane.

Figure 1:
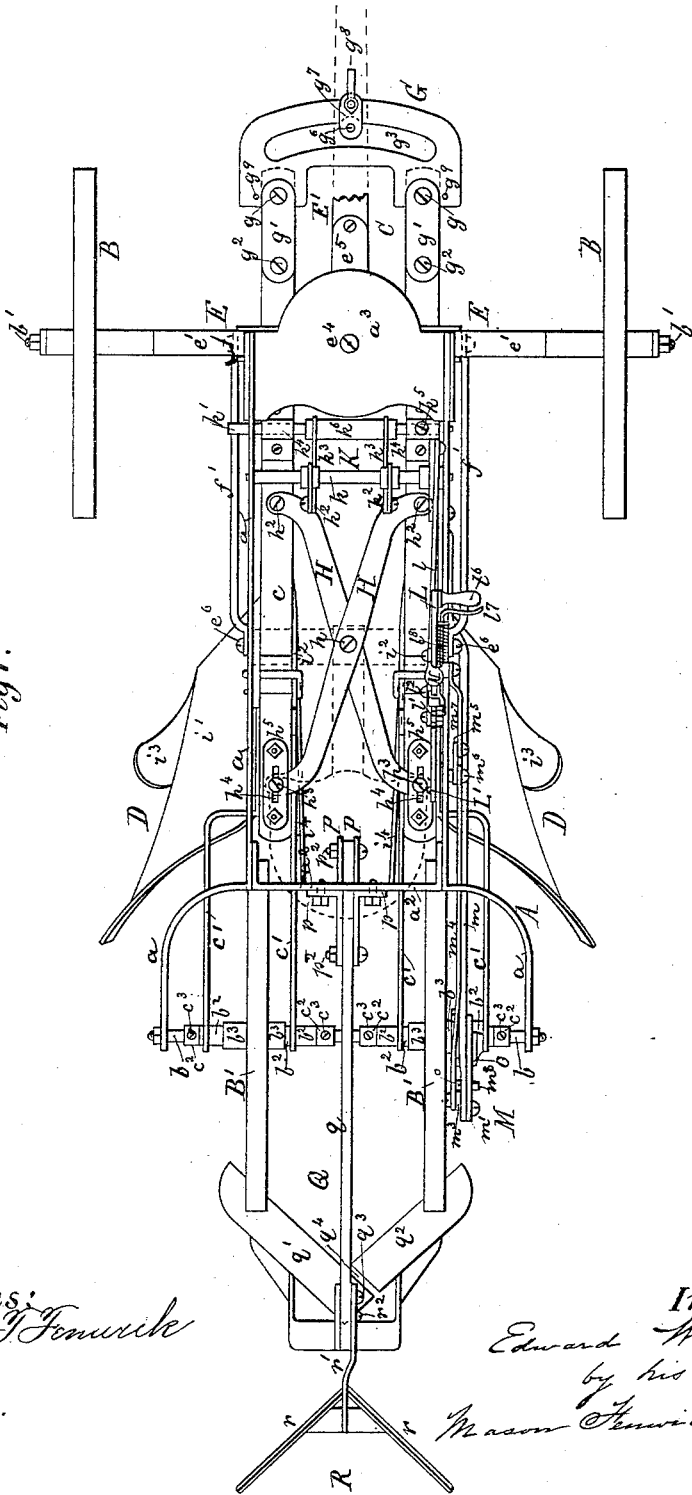
Figure 2:
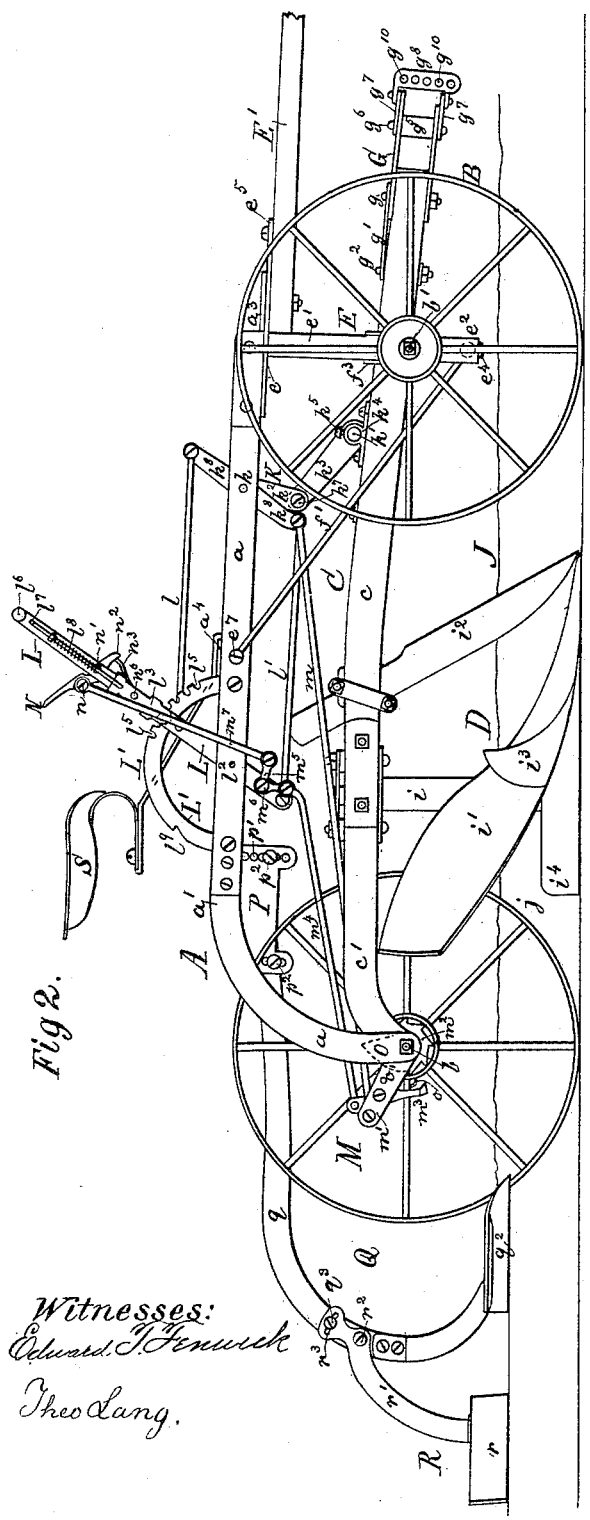
Figure 3:
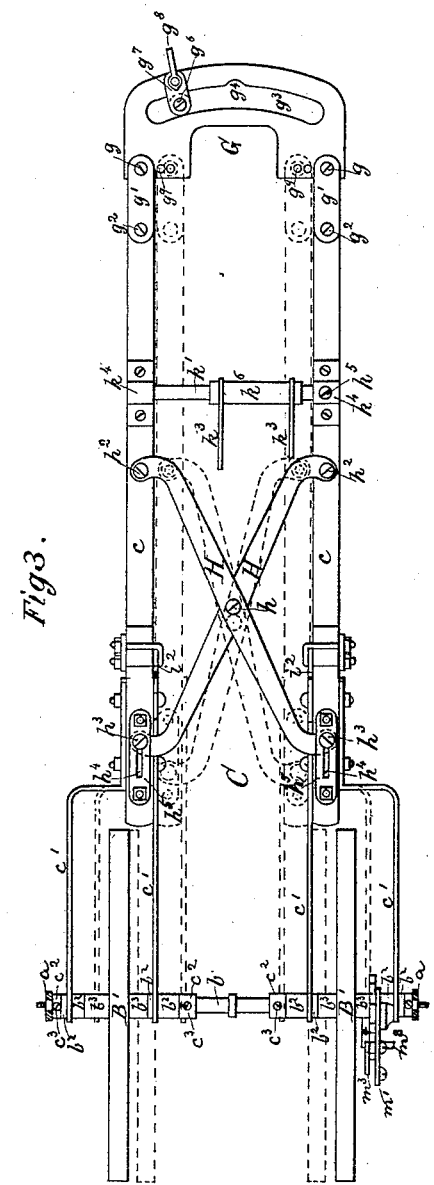

In the accompanying drawings, illustrating my invention, Figure 1 is a top view of my sugar-cane cultivator. Fig. 2 is a side elevation of the same. Fig. 3 is a detail view of the adjustable plow-beams and their horizontal adjusting means. Fig. 4 is an end view of the cultivator. Fig. 5 is a detail view of the vertical guide of the plow-beams and a horizontal section of the guide-yoke and of the fifth-wheel yoke. Fig. 6 is a detail view of the guide-plates of the horizontal adjusting means of the plow-beams, the upright guide-yoke being in horizontal section. Fig. 7 is a diagram showing specially the vertical adjusting means of the plow-beams. Fig. 8 is a vertical central section through the vertical guide-yoke of the plow-beams and through the fifth-wheel yoke, and also other parts. Fig. 9 is a diagram of the two plows with their furrow-cutters and a landside-cutter. Fig. 10 is a diagram of the automatic plow-raising mechanism. Fig. 11 is a section of the draft-plate and clevis.

The letter A in the drawings represents the main frame of the cultivator; B B, the front wheels; B' B', the rear wheels; C, the adjustable plow-frame, and D the plows.

The main frame A consists of two parallel beams, $a$, having the rear axle, $b$, fastened between them and rising to a suitable height at $a'$ near the rear wheels, where they are coupled and steadied by means of a transverse brace, $a^2$. The front ends of said plow-beams $a$ are secured to a horizontal bearing-plate, $a^3$, which rests upon a fifth-wheel plate, $e$, of a swinging oblong vertical yoke, E. This yoke E consists of a very stout upper arch, $e'$, to which the plate $e$ and the axles $b'$ of the front wheels, B, are fastened, and a lower inverted arch, $e^2$, of lighter construction, which is fastened to the upper arch by means of screws $e^3$ and the screw-threaded ends of the axles $b'$.

Inside the yoke E an oblong yoke, F, is hung by means of vertical central or king-bolts $e^4$. The said yoke F is held in a vertical position and prevented from swinging with the yoke E by means of braces $f'$, fastened by bolts $e^6$ and $e^7$ to the lower portion of the yoke and the beams $a$, as shown. The vertical side portions, $f^2$, of the yoke F serve as guides for the angular channeled end portions, $f^3$, of a horizontal cross-plate, $f^4$, which end portions are so fitted to the side portions, $f^2$, as to easily slide up and down thereon. The plate $f^4$ rests upon two yoke-plates, $f^5$, fitted to the beams $c$ of the plow-frame C, so that they may slide thereon. These plates $f^5$ are each provided with a steady-pin, $f^6$, and a headed bolt, $f^7$, which are inserted into two slots, $f^8$, in the plate $f^4$. By this construction the front portions of the plow-beams, after being laterally adjusted, as will be seen, can be centrally fastened to the plate $f^4$ by means of the bolts $f^7$, and are thus held in central position laterally to the main frame A while being moved up and down for the purpose of vertical adjustment hereinafter described.

To an extension, $e^5$, of the fifth-wheel plate $e$ the tongue E' is suitably fastened.

The forward ends of the plow-beams $c$ are coupled by means of two parallel metal draft plates, G, and bolts $g$. This attachment may be strengthened by the addition of strap-plates $g'$, the front portions of which are screwed by the bolts $g$ upon the plate G, and the rear portions to the beams $c$ by means of bolts $g^2$. Each plate G is provided with a curved slot, $g^3$, the two slots being the one directly over the other, and concentric with the king-bolts $e^4$, and having each a central notch, $g^4$. A vertical roller, $g^5$, is hung by means of a draft-bolt, $g^6$, and two coupling-arms, $g^7$, of a clevis, $g^8$, in said curved slots. Under ordinary circumstances, while the cultivator is moved in a straight or nearly straight line the roller $g^5$ will be in the notches $g^4$; but when the plow is to be turned at an angle the oblique pull of the horses will cause the roller to leave the notches $g^4$ and assume such position in the curved slots that the direction of draft will form a right angle with the corresponding curvature of the slots, and thus the clevis will always be kept in line with the tongue of the cultivator. The plates G are provided with several bolt-holes, $g^9$, in order to accomodate the plates to the lateral adjustment of the plow-beams, as will be seen.

The clevis $g^8$ is provided with a vertical row of holes, $g^{10}$, in order to enable the teamster to attach the draft-hook to the plow at a suitable elevation.

The plow-frame C consists, as above stated, of two parallel plow-beams, $c$, with forked rear ends, $c'$, through which the rear axle, $b$, passes, and between which the hubs $b^2$ of said forked ends $c'$ and the hubs $b^3$ of the rear wheels, B', are confined, so that the wheels and the plow-beams shall be laterally adjusted together. The lateral adjustments are effected by the aid of shears or diagonal plates H, having a central fulcrum, $h$, and being pivoted at their forward ends to the plow-beams by means of pivot-bolts $h^2$. The rear ends of these shear-plates are provided with headed pins $h^3$, which move in slots $h^4$ of longitudinal guide-plates $h^5$, bolted suitably to the plow-beams. By this construction the plow-beams and rear wheels are kept parallel with each other, whatever their lateral adjustment may be.

In order to secure the rear portion of the plow-frame and the rear wheels in their central position with the main frame A, adjustable collars $c^2$, having set-screws $c^3$, are fastened to the axle $b$ to the right and left of each fork $c'$, immediately after each lateral adjustment of the plow-frame.

Two corresponding plows, D, are, by means of suitable standards, $i$, fastened to the plow-beams $c$, and their mold-boards $i'$ rise right and left from the plow-beams and discharge outwardly. In front of each landside an inclined cutter, $i^2$, is placed and suitably fastened to the corresponding plow-beam, $c$, and at a suitable distance from the landside each mold-board is provided with an inclined cutter, $i^3$, and thus trenches with smooth sides can be made with my plows, which with the old method was not possible. The heels $i^4$ of the plows are set nearer together than the points in order to prevent the plowed sides $j$ of the central ridge, J, from losing their consistency and breaking away during the cutting off of old sprouts and roots by the cutters $i^2$. The rear wheels, B' B', running in the trenches made by the plows, are held away from the sides of the central ridge, and are thereby prevented from rubbing against them and breaking their continuity.

The front portion of the plow-frame C is supported by the main frame above by means of a toggle-joint, K. This toggle-joint consists of two transverse shafts, $k$ $k'$, and two pairs of levers, $k^2$ $k^2$ $k^3$ $k^3$. The shaft $k$ is suitably hung to the main frame A, and the levers $k^2$ $k^2$ are fastened to the said shaft at equal distances from the sides of the main frame A. The lower shaft, $k'$, rests in cylindrical bearings $k^4$, suitably fastened to the plow-beams $c$, one of which bearings is provided with a set-screw, $k^5$, which is screwed down upon the shaft $k'$, and thus holds the shaft to its relative beam $c$. The shaft $k'$ is loosely held in the other bearing $k^4$, so it may slide therein when the plow-frame is adjusted to a greater or less width. On the shaft $k'$ a sleeve, $k^6$, is loosely fitted, which sleeve is provided with the levers $k^3$ $k^3$, which latter are joined to the levers $k^2$ $k^2$ by means of pins or screw-pivots $k^7$. The shaft $k$ is also provided with a double-armed lever, $k^8$, which is connected by means of two parallel connecting-rods, $l$ $l'$, with a hand-lever, L, having its fulcrum at $l^2$ on the main frame A. By connecting the levers $k^8$ and L in the described manner either the upper connecting-rod, $l$, or the lower one, $l'$, operates by pulling, and neither of them operates by pushing, and I am therefore enabled to use very light connecting-rods without danger of bending them.

A notched arc, L', is attached to the main frame concentrically with the fulcrum $l^2$ of the lever L. The hand-lever L is provided with an ordinary spring-bolt, $l^3$, having a tooth, $l^4$, which enters the notches $l^5$ of the arc. Below the transverse handle $l^6$ of the hand-lever L another handle, $l^7$, of the spring-bolt $l^3$ is placed, whereby the spring-bolt is disconnected from the notches of the arc L' when the position of the hand-lever L is to be changed. For this purpose the handle $l^7$ is moved up against the tension of the bolt-spring $l^8$, whereby the tooth $l^4$ is removed from the notch $l^5$ it occupied and the hand-lever is free to be turned as required. By releasing the handle $l^6$ the hand-lever becomes again locked with the arc L'. In Fig. 7 the two extreme positions of the hand-lever and the therefrom resulting positions of the plow-frame are represented, one of the plows being shown in its highest position by dotted lines, while the other position of the plow is not deemed necessary to be shown in this view.

A connecting-rod, $m$, connects the lower end of the lever $k^3$ with an arm, $m'$, of an elevating mechanism, M, on one end of the rear axle, $b$. The arm is made to swing on the axle $b$ when it is locked with the wheel B'. For this latter purpose the wheel B' is provided with a ratchet-wheel, $m^2$, and the arm $m'$ with a pawl, $m^3$, the latter being connected by means of a connecting-rod, $m^4$, with a bell-crank lever, $m^5$, which has its fulcrum at $m^6$ on the hand-lever L. A rod, $m^7$, connects the bell-crank lever $m^5$ with its operating handle-lever N at $n$. This lever N has a fulcrum-pin, $n'$, fastened to the hand-lever L, and it extends to the other side of the hand-lever L and terminates with an eye, $n^2$, through which a rod, $n^3$, passes, which has a head, $n^4$, above said eye, and an eye, $n^5$, at its lower termination. A pin, $n^6$, is passed through the eye $n^5$, and a slot, $l^{10}$, in the hand-lever L, and is fastened to the spring-bolt $l^3$.

When the handle-lever N is depressed, the rod $n^3$ pulls up the spring-bolt and disconnects the hand-lever L from the arc L', and at the same time the rod $m^7$ is moved down, whereby the bell-crank lever $m^5$ is caused to move the connecting-rod $m^4$ backward and swing the pawl $m^3$ within the range of the ratchet-wheel $m^2$. While the cultivator is going ahead one of the teeth of the ratchet-wheel $m^2$ engages the pawl $m^3$ and moves it along, whereby the arm $m'$ is swung in a forward direction and the connecting-rod $m$ is moved forward, and thus the levers $k^3$ and L are swung backward. A notch, $l^9$, is provided in the arc, by which the hand-lever is finally locked when the plows are at their proper elevation above the ground for transporting from place to place; and in order to prevent the ratchet-wheel from moving the pawl $m^3$ too far ahead, and thereby injuring the plow-elevating mechanism, a cam, O, is attached to the frame A closely to the arm $m'$, upon which the extended end $m^8$ of the pawl slides, and by which the pawl is moved out of range of the ratchet-wheel as soon as the hand-lever L has arrived opposite the notch $l^9$.

A spring, $o$, fastened with one end to a pin, $o'$, on the arm $m'$, holds the pawl $m^3$ out of range of the ratchet-wheel $m^2$ when not operated by the lever N. The same effect for lifting the plows would be gained by moving up the handle $l^6$, and then swinging the lever L back by hand; but this requires more power than an ordinary man can well develop, owing to the great weight that has to be lifted, and therefore the assistance of my mechanism is desirable.

The main-frame brace $a^2$ is, at its center, provided with two parallel plates, P, having angular flanges $p$, by which the plates are bolted to the brace. The ends of these plates are provided with vertical rows of holes $p'$, for the purpose of inserting two bolts, $p^2 p^2$, and thereby fastening the front portion of a surface-shaving attachment, Q, between said plates. This shaving attachment Q consists of a curved beam, $q$, the front portion of which is fastened between the plates P, and the rear portion of which is forked, and provided with two inclined cutters, $q' q^2$, arranged at an angle corresponding with, say, the letter V, having its apex rearward. The cutter $q'$ is longer than the cutter $q^2$, and its rear end extends to the rear side of cutter $q^2$, and also stands off a suitable distance from the same, in order to allow stumps which are firmly connected with the mother cane below and not decayed enough to be shaved off without great resistance, to pass through the opening $q^4$ at the apex without harm, thus avoiding the tearing up of the mother cane by reason of catching such stumps with a closed cutting-apex, but at the same time causing the continued cutting portion behind the apex to lay such stumps sufficiently over, so as to effect an easy cut in an inclined direction to the axis of the stump.

The front portion of the beam $q$ is provided with suitable holes, through which the coupling-bolts $q^2 q^2$ in the plates P are passed after the desired elevation of the cutters has been effected, and the corresponding holes, $p'$, in the plates P for the suitable fastening of the beam $q$ have been found.

Behind the shaving-cutters a scraper, R, is attached to the beam $q$. This scraper consists of two vertical or nearly vertical boards, $r$, or metal sheets united at the front, so as to form an angle, and fastened to a beam, $r'$, which is loosely bolted to the beam $q$ at $r^2$, and which is provided with a slot, $r^3$, concentric to the bolt $r^2$. A pin or suitable bolt, $q^3$, on the beam $q$ passes into said slot $r^3$, and thus limits the play of the beam $r'$ around the fulcrum $r^2$. By means of this allowance of play the scraper will bear with no more than its own weight upon the shaved surface of the central ridge, which weight is sufficient to keep the scraper down, in order to do its work effectively; but when any unevenness of the shaved surface has to be passed the scraper will yield to the same without being caught or interrupted in its work.

In front of the arc L' a transverse brace, $a^4$, connects the beams $a$ of the main frame, and to this brace the driver's seat S is suitably attached.

When the cane-cultivator is moved to or from the sugar-cane field, the hand-lever L is held by the notch $l^9$ of the arc L', and the plows are held sufficiently high over the ground or road, and, having arrived at the field, the surface-shaving attachment Q is adjusted to the required elevation, the bolts $f^i$ and set-screws $c^3$ are loosened, and the bolts $g$ removed from the draft-plates. The plow-beams $c$ are now laterally adjusted to the width of the intended center ridge by hand. The draft-plates G are then centrally arranged upon the plow-beams, and then refastened by the bolts $g$. The bolts $f^7$ are drawn tight again. The collars $c^2$ are moved against the forks $c'$ and fastened by screwing the set-screws $c^3$ upon the shaft $b$. The lateral adjustment now being accomplished the driver mounts the seat S and drives the horses into the furrows between the cane ridges, and as the front wheels enter the furrows he unlocks the hand-lever L and moves it forward until he finds that the plows make a sufficiently deep trench, when he locks it in one of the notches $l^5$ in the arc L'. Every time a ridge is cultivated the plows are raised up by means of the elevating mechanism M, above described, and the cultivator is turned around, and the next ridge is cultivated, as aforesaid, until the field is finished. The plows I throw the detached soil and cane into the furrows right and left, but not quite to the centers of the same, so that at the return-trip of the cultivator one of its front wheels does not become unduly elevated over the other by reason of running in a partially-filled-up furrow. The scrapings of the surface-shaver are thrown right and left into the freshly plowed trenches, at the bottom of which they remain. The surface-shaving attachment Q remains on the frame A of the cultivator only during the operation of cultivating, and may be detached when the cultivator is being transported from the field.

What I claim as my invention is—

1. The combination, with the tongue E', connected to a yoke, E, which turns on the king-bolt $e^4$, of the plow-beams $c$ $c$, connected at their front ends by coupling draft-plates G, in which are curved slots $g^3$, concentric with the king bolt, and notches $g^4$ about centrally of their length, and an automatic laterally-moving clevis, $g^5$, comprising coupling-arm $g^7$ and a draft-bolt, $g^6$, substantially as and for the purpose described.

2. In a cane-cultivator, the combination of a main frame, A, supported by wheels B B' on a rigid rear axle, $b$, and a swinging front axle-yoke, E, with a vertically and horizontally adjustable plow-frame, C, swinging vertically upon the rear axle and having the clevis applied to it, substantially as and for the purpose set forth.

3. The laterally-expansible plow-frame C, having shear-plates H, with a common fulcrum, $h$, end fulcrums, $h^2$, on the plow-beams $c$, sliding end pins, $h^3$, and slotted guide-plates $h^5$, secured to the plow-beams, substantially as and for the purpose set forth.

4. The combination, with the wheeled main frame A, and the plow-frame C, and suitable connections, of the hand-lever L, elevating-lever $k^8$, toggle-joint K, and parallel connecting-rods $l$ $l'$, arranged on both sides of the fulcrums of said levers, substantially as and for the purpose set forth.

5. The combination of the rear axle, $b$, fastened by its ends rigidly to the main frame A, the laterally and centrally adjustable forked plow-frame C, having forked ends $c'$, and adjustable plates G, rear wheels, B', and collars $c^2$, having set-screws $c^3$, substantially as and for the purpose set forth.

6. The combination, with the main or supporting frame A, mounted on four wheels, of the plow-frame C, carrying right and left plows D, and shaver Q, having knives $q'$ $q^2$, separated to form relief-passage $q^4$, and the scraper R, substantially as and for the purpose described.

7. In a sugar-cane cultivator having a supporting wheeled frame, A, the combination, with the shaver Q and scraper R, of two corresponding centrally and laterally adjustable plows, D D, having right and left mold-boards and furrow side cutters, substantially as and for the purpose described.

8. The combination of the wheeled frame A, plow-frame C, toggle-joint elevating mechanism K, levers L $k^8$, notched arc L', and connecting-rods $l$ $l'$, for raising and lowering the plow-frame by hand, substantially as described.

9. The combination of the wheeled frame A, plow-frame C, levers L $k^8$, connecting-rods $l$ $l'$ $m$ $m^4$ $m^7$, handle N, and elevating mechanism M, substantially as and for the purpose set forth.

10. The combination of the main frame A, mounted on four wheels, the plow-frame C, carrying two corresponding right and left handed plows, and provided with yoke F and braces $f'$, and the horizontally-turning yoke E, having tongue E' attached to it, substantially as and for the purpose described.

11. The right and left plows D D, applied upon the plow-frame C and main frame A, and provided with landsides which converge toward each other as they extend backward, and with cutters $i^2$, substantially as and for the purpose described.

In testimony whereof I affix my signature in presence of two witnesses.

EDWARD WIARD.

Witnesses:
S. A. PLUMLEY,
S. A. SCARP.